(12) United States Patent
Nou et al.

(10) Patent No.: US 7,343,238 B2
(45) Date of Patent: Mar. 11, 2008

(54) SPEED CONTROLLER FOR CAR USING TELEMATICS AND CONTROL METHOD THEREOF

(75) Inventors: Seong-Taeg Nou, Ichon-si (KR); Hyeon-Su Kim, Ichon-si (KR); Chang-Hwan Lim, Ichon-si (KR); Jung-Hyun Lim, Ichon-si (KR); Jung-Mi Han, Ichon-si (KR); Jun-Ho Lee, Ichon-si (KR)

(73) Assignee: Hyundai Autonet Co., Ltd., Ichon-Si (KR)

( * ) Notice: Subject to any disclaimer, the term of this patent is extended or adjusted under 35 U.S.C. 154(b) by 250 days.

(21) Appl. No.: 11/170,079

(22) Filed: Jun. 30, 2005

(65) Prior Publication Data

US 2007/0005217 A1    Jan. 4, 2007

(51) Int. Cl.
*G08G 1/16* (2006.01)
(52) U.S. Cl. ........................... 701/93; 340/903
(58) Field of Classification Search .................. 701/78, 701/96, 301; 340/903, 435, 436; 303/125
See application file for complete search history.

(56) References Cited

U.S. PATENT DOCUMENTS

| | | | | |
|---|---|---|---|---|
| 5,984,433 | A * | 11/1999 | Stumpe et al. ............. | 303/155 |
| 6,292,753 | B1 * | 9/2001 | Sugimoto et al. .......... | 701/301 |
| 6,473,681 | B1 * | 10/2002 | Eckert et al. ................ | 701/70 |
| 6,864,783 | B2 * | 3/2005 | Rao et al. .................... | 340/435 |
| 2004/0019426 | A1 * | 1/2004 | Knoop et al. ............... | 701/301 |
| 2005/0125137 | A1 * | 6/2005 | Shiiba et al. ................ | 701/96 |
| 2006/0052917 | A1 * | 3/2006 | Schwarzhaupt et al. ...... | 701/29 |

\* cited by examiner

Primary Examiner—Dalena Tran
(74) Attorney, Agent, or Firm—Staas & Halsey LLP

(57) ABSTRACT

Disclosed herein is a technology for controlling speed of a car. More specifically, the invention relates to a speed controller for a car using telematics, the controller comprising a sensor unit to detect the speed of the car, the distance from the car to an object in front, and the operating status of a brake pedal and an accelerator pedal, a telematics system to output a signal to control the travel speed of the car and a gear shifting signal, when the speed of the car and the distance from the car to the object in front exceeds a preset range of an approaching distance, a speed regulation system to maintain the travel speed of the car within a speed limit by controlling an accelerator pedal and a brake pedal control unit, and an automatic transmission system to set a gear shifting level by controlling a gear shifting lever control unit.

6 Claims, 3 Drawing Sheets

SPEED CONTROLLER FOR CAR USING TELEMATICS AND CONTROL METHOD THEREOF

BACKGROUND OF THE INVENTION

1. Field of the Invention

The present invention relates to a technology for controlling speed of a car. More specifically, the invention relates to a speed controller for a car using telematics and a control method thereof, in which, by connecting a speed control unit and a brake control unit of a car together with a speed detecting sensor to a telematics system for a car, the travel speed of the car is monitored at all times, and, furthermore, if the monitored travel speed of the car exceeds a certain range (for example, the distance from the car to an object in front or a speed limit), regardless the operation of a driver, the brake control unit is controlled so that the car can travel within a speed limit, thereby preventing in advance a collision accident with the object in front.

2. Description of the Related Art

As is known publicly, a car is designed in a pattern that the car speeds up proportionally to the extent of pressing an accelerator pedal, and the speed relates to traveling is displayed through a gauge installed on a dash panel so that a driver may recognize.

In addition, conventionally, in order to enhance safety in connection with the traveling of a driver, a sensor is attached at the front portion of a car to measure the distance to an object in front (for example, a car).

However, conventionally, although a driver measures the distance to the object in front by detecting action of the sensor, in the case where the driver does not keep a safety distance properly with respect to the travel speed, the driver does not have enough time to determine promptly the distance to the object in front and respond accordingly, thereby incurring inevitably personal losses by the collision with the object in front.

SUMMARY OF THE INVENTION

Additional aspects and/or advantages of the invention will be set forth in part in the description which follows and, in part, will be apparent from the description, or may be learned by practice of the invention.

Therefore, the present invention has been made in view of the above problems occurring in the prior art, and it is an object of the present invention to provide a speed controller for a car using telematics and a control method thereof, in which, by connecting a speed control unit and a brake control unit of a car together with a speed detecting sensor to a telematics system for a car, the travel speed of a car is monitored at all times, and, furthermore, if the monitored travel speed of a car exceeds a predetermined range (for example, the distance to an object in front or a speed limit), regardless of the operation of a driver, the brake control unit is controlled so that the car can travel within a speed limit, thereby solving the above problems caused by the narrowed distance to the object in front according to the travel speed and preventing in advance a collision accident with the object in front.

To accomplish the above objects, according to one aspect of the invention, there is provided a speed controller for a car using telematics. The speed controller of the invention includes: a sensor unit for detecting the speed of the car according to traveling, the distance to an object in front, and the operating status of a brake pedal and an accelerator pedal; a telematics system for outputting a signal for controlling the travel speed of the car automatically and a gear shifting signal so as to prevent a collision accident with the object in front, when the travel speed of the car and the distance to the object in front exceeds a preset range of an approaching distance, in response to the signal detected by the sensor unit; a speed regulation system for maintaining the travel speed of the car within a speed limit by controlling an accelerator pedal and a brake pedal control unit, in response to the control signal outputted by the telematics system; and an automatic transmission system for setting a gear shifting level corresponding to the travel speed of the car controlled by the speed regulation system by automatically controlling a gear shifting lever control unit, in response to a gear shifting signal outputted by the telematics system.

According to an aspect of the present invention, the sensor unit includes a first sensor for detecting the travel speed of a car, a second sensor for detecting the distance between a car and an object in front when a car travels, a third sensor for detecting the operating status of the accelerator pedal operated by a driver, a fourth sensor for detecting the operation status of the brake pedal operated by a driver, and a fifth sensor for detecting the gear shifting status of the gear shifting lever.

In addition, the telematics system includes: a Global Positioning System (GPS) receiver for receiving the travel speed of the car detected by a satellite; a distance setting unit for setting a range of the approaching distance between the traveling car and the object in front while the car is traveling; an acceleration setting unit for setting a range of acceleration while the car is traveling, the range of acceleration being determined by the operation of the accelerator pedal and the gear shifting lever; a deceleration setting unit for setting a range of deceleration while the car is traveling, the range of deceleration being determined by the operation of the brake pedal and the gear shifting lever; a memory for storing the information set by the distance setting unit, the acceleration setting unit and the deceleration setting unit; a signal receiver for receiving the signal detected by the sensor unit; a brake controller for outputting a signal for operating and controlling the accelerator pedal and the brake pedal control unit based on the information stored in the memory and a gear shifting signal for operating and controlling the gear shifting lever control unit, when the signal receiver receives the signal detected by the sensor unit, in which the information contains the approaching distance to the object in front and the travel speed of the car; and a signal output unit for outputting the control signal and the gear shifting signal outputted from the brake controller to the accelerator pedal and brake pedal control unit and the gear shifting control unit according to an aspect of the present invention.

According to another aspect of the present invention, there is provided a method of controlling the speed of a car. The method includes: detecting the object in front, the travel speed of the car, and the operating status of the accelerator pedal, the brake pedal, and the gear shifting lever operated by the driver, while the car is traveling; calculating the travel speed of the accelerated car and the distance to the object in front using the information detected by the detecting operation, when the travel speed of the car is accelerated by the driver; determining whether the distance between the accelerated car and the object in front is closer than the range of the approaching distance (current distance≧preset distance) from the calculated travel speed and distance; decelerating the travel speed of the accelerated car to the speed limit through the selective control of the accelerator pedal control unit, the brake pedal control unit, and the gear shifting lever control unit, when the distance between the accelerated car and the object in front is getting closer than the preset range of the approaching distance, as the result of the above calculation; determining whether the distance between the car and the object in front maintains the preset range of the approaching distance (current distance<preset distance), when the travel speed of the car is reduced to the speed limit at the decelerating operation; and performing repeatedly the operation of determining whether the distance between the car and the object in front maintains the preset range of the approaching distance when the distance between the decelerated car and the object in front does not maintain the preset approaching distance, or returning to the calculating operation when the distance between the decelerated car and the object in front is longer than the preset approaching distance, as the result of the above determination.

In addition, the operation of determining whether the distance between the car and the object in front maintains the preset range of the approaching distance includes: reducing the travel speed of the car to the speed limit by cutting off the power of the accelerator pedal through the driving control of the accelerator pedal control unit, if the accelerator pedal is operating when the distance between the accelerated car and the object in front is closer than the preset approaching distance.

In addition, the step determining whether the distance between the car and the object in front maintains the preset range of the approaching distance further includes steps of: determining whether the travel speed of the car resulting from the operation of the brake pedal approaches the preset reduced speed, if the brake pedal is operating when the distance between the accelerated car and the object in front is closer than the preset approaching distance; reducing the speed of the car to the speed limit by forcibly controlling the operation of the brake pedal through the brake pedal control unit, if the travel speed of the car resulting from the operation of the brake pedal does not approach the preset reduced speed, as the result of the determination; and bringing down the level of the gear shifting lever, if the travel speed of the car resulting from the operation of the brake pedal approaches the preset reduced speed, as the result of the determination.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
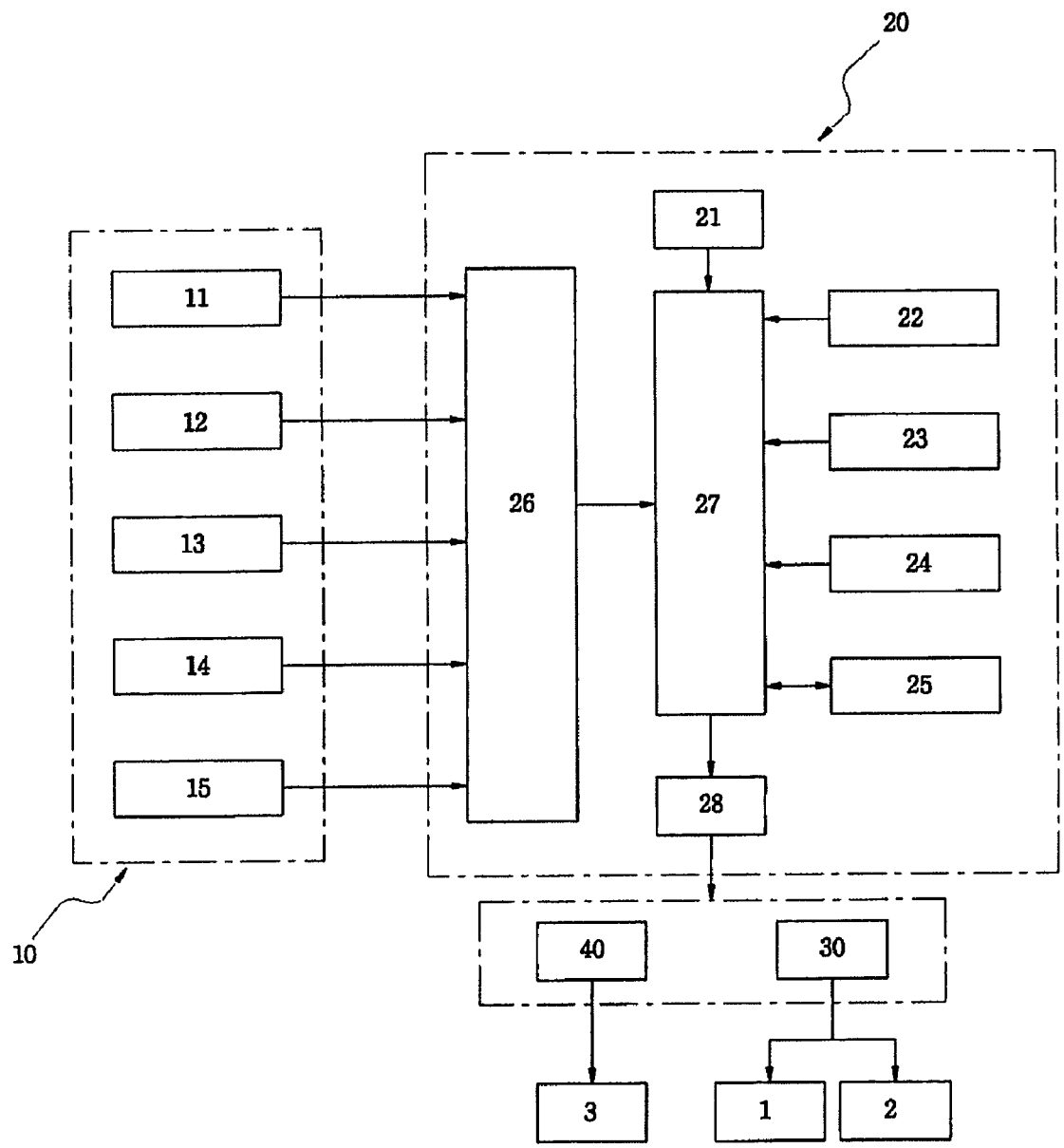
FIG. 1 shows a block diagram of a speed controller, wherein a car uses telematics in one embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
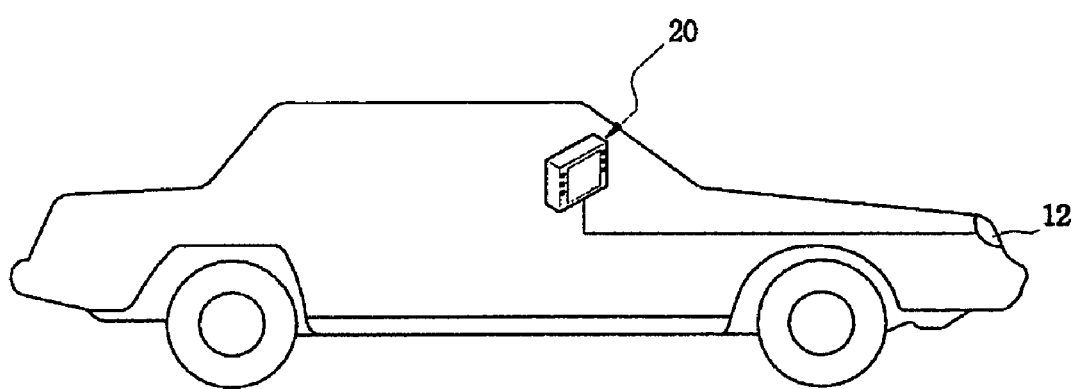
FIG. 2 shows a speed controller, wherein a car uses telematics mounted on a car in one embodiment of the present invention.

FIG. 1 shows a block diagram of a speed controller, where a car uses telematics in one embodiment of the present invention, and FIG. 2 shows a speed controller where a car uses telematics mounted on a car in one embodiment of the present invention.

As shown in FIGS. 1 and 2, a speed controller for a car using telematics includes: a sensor unit 10 to detect the speed of the car according to traveling, the distance to an object in front, and the operating status of a brake pedal and an accelerator pedal; a telematics system 20 to output a signal to control the travel speed of a car automatically and a gear shifting signal so as to prevent a collision accident with the object in front, when the travel speed of the car and the distance to the object in front exceeds a preset range of an approaching distance, in response to the signal detected by the sensor unit 10; a speed regulation system 30 to maintain the travel speed of the car within a speed limit by controlling an accelerator pedal and a brake pedal control unit 1, 2, in response to the control signal outputted by the telematics system 20; and an automatic transmission system 40 to set a gear shifting level corresponding to the travel speed of the car controlled by the speed regulation system 30 by controlling a gear shifting lever control unit 3 automatically, in response to the gear shifting signal outputted by the telematics system 20.

According to another aspect of the present invention, the sensor unit 10 includes a first sensor 11 to detect the speed of a car, a second sensor 12 to detect the distance between the car and an object in front when the car travels, a third sensor 13 to detect the operating status of the accelerator pedal operated by a driver, a fourth sensor 14 to detect the operation status of the brake pedal operated by a driver, and a fifth sensor 15 to detect the gear shifting status of the gear shifting lever.

According to an aspect of the present invention, the telematics system 20 includes a GPS receiver 21 to receive the speed of the car detected by a satellite, a distance setting unit 22 to set a range of an approaching distance between the traveling car and the object in front while the car is traveling, an acceleration setting unit 23 to set a range of acceleration while the car is traveling, the range of acceleration being determined by the operation of the accelerator pedal and the gear shifting lever, a deceleration setting unit 24 to set a range of deceleration while the car is traveling, the range of deceleration being determined by the operation of the brake pedal and the gear shifting lever, a memory 25 to store the information set by the distance setting unit 22, the acceleration setting unit 23 and the deceleration setting unit 24, a signal receiver 26 to receive the signal detected by the sensor unit 10, a brake controller 27 to output a signal to operate and control the accelerator pedal and the brake pedal control unit 1, 2 based on the information stored in the memory 25 and a gear shifting signal to operate and control the gear shifting lever control unit 3, when the signal receiver 26 receives the signal detected by the sensor unit 10, in which the information contains the approaching distance to the object in front and the travel speed of the car, and a signal output unit 28 to output the control signal and the gear shifting signal outputted from the brake controller 27 to the accelerator pedal and brake pedal control unit 1, 2 and the gear shifting control unit 3.

Figure 3:
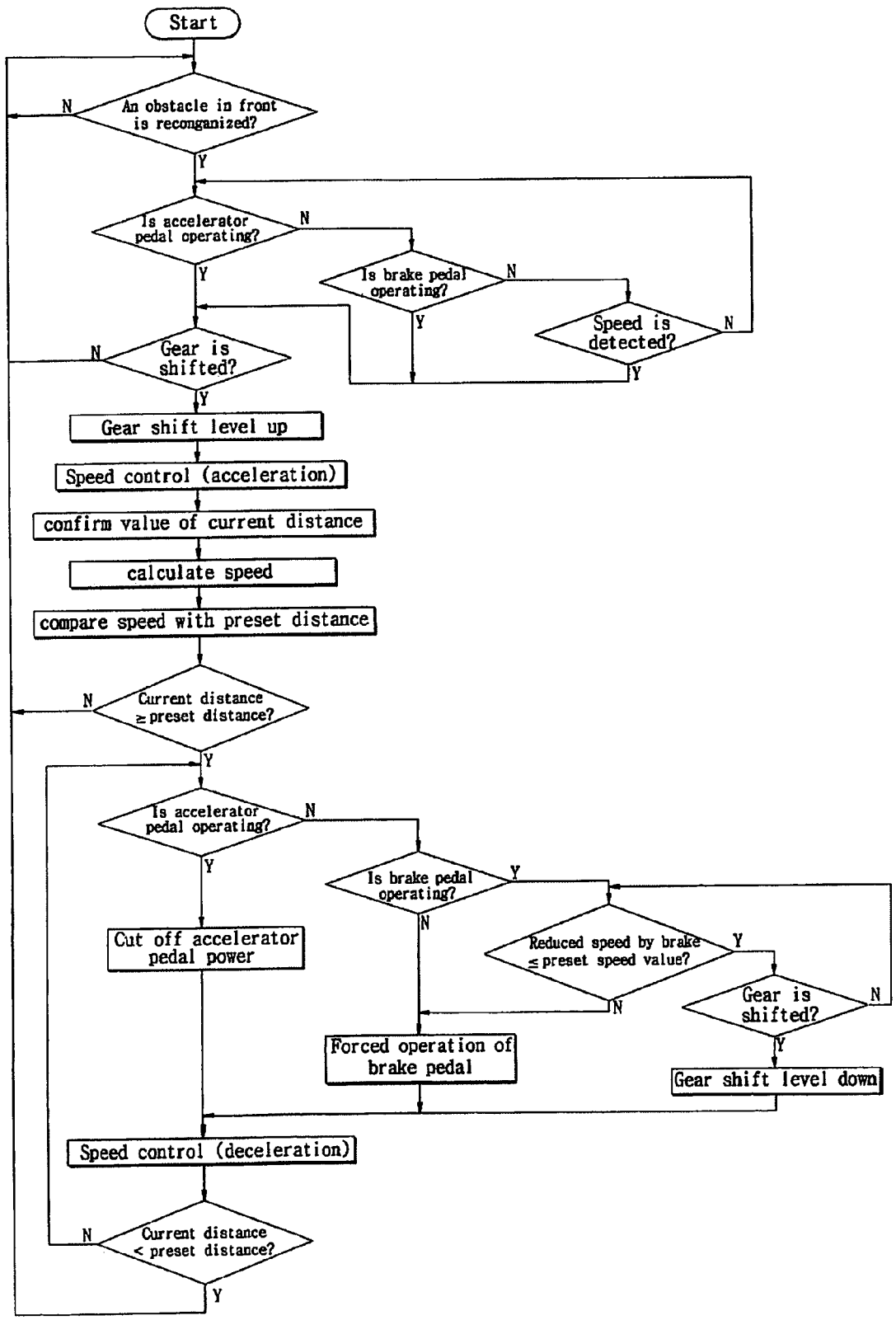
FIG. 3 is a flow chart showing a method of controlling the speed of a car using telematics in one embodiment of the present invention.

On the other hand, FIG. 3 is a flow chart showing a method of controlling the speed of a car embodied by a speed controller for a car using telematics in one embodiment of the invention, the method including: detecting the object in front, the travel speed of the car, and the operating status of the accelerator pedal, the brake pedal, and the gear shifting lever operated by the driver, while the car is traveling; calculating the travel speed of the accelerated car and the distance to the object in front using the information detected by the detecting operation, when the travel speed of the car is accelerated by the driver; determining whether the distance between the accelerated car and the object in front is closer than the range of the approaching distance (current distance≧preset distance) from the calculated travel speed and distance; decelerating the travel speed of the accelerated car to the speed limit through the selective control of the accelerator pedal control unit 1, the brake pedal control unit 2, and the gear shifting lever control unit 3, when the distance between the accelerated car and the object in front is getting closer than the preset range of the approaching distance, as the result of the above calculation; determining whether the distance between the car and the object in front maintains the preset range of the approaching distance (current distance<preset distance), when the travel speed of the car is reduced to the speed limit at the decelerating operation; and performing repeatedly the operation of determining whether the distance between the car and the object in front maintains the preset range of the approaching distance when the distance between the decelerated car and the object in front does not maintain the preset approaching distance, or returning to the calculating operation when the distance between the decelerated car and the object in front is longer than the preset approaching distance, as the result of the above determination.

According to one aspect of the present invention, the operation of determining whether the distance between the car and the object in front maintains the preset range of the approaching distance includes: reducing the travel speed of the car to the speed limit by cutting off the power of the accelerator pedal through the driving control of the accelerator pedal control unit 1, if the accelerator pedal is operating when the distance between the accelerated car and the object in front is closer than the preset approaching distance.

According to another aspect of the present invention, the operation of determining whether the distance between the car and the object in front maintains the preset range of the approaching distance further includes: determining whether the travel speed of the car resulting from the operation of the brake pedal approaches the preset reduced speed, if the brake pedal is operating when the distance between the accelerated car and the object in front is closer than the preset approaching distance; reducing the speed of the car to the speed limit by controlling the operation of the brake pedal forcibly through the brake pedal control unit 2, if the travel speed of the car resulting from the operation of the brake pedal does not approach the preset reduced speed, as the result of the determination; and bringing down the level of the gear shifting lever, if the travel speed of the car resulting from the operation of the brake pedal approaches the preset reduced speed, as the result of the determination.

The operation of the embodiment of the invention configured above will be hereafter explained, with reference to the accompanying FIGS. 1 to 3.

First, when a driver accelerates the travel of a car by operating the gear shifting lever together with the accelerator pedal and the brake pedal alternatively, the first sensor 11 of the sensor unit 10 detects the travel speed of the car and outputs the travel speed to the telematics system 20.

In addition, the second sensor 12 of the sensor unit 10 mounted on the front portion of the car detects the distance to the object in front and outputs the detected information to the telematics system 20. The third and the fourth sensor 13, 14 in the sensor unit 10 detect the operating status of the accelerator pedal and the brake pedal and output the detected information to the telematics system 20. The fifth sensor 15 in the sensor unit 10 detects the control status of the gear shifting lever and outputs the detected status to the telematics system 20.

Here, the telematics system 20 includes a GPS receiver 21, and the GPS receiver 21 receives the speed of the car traveling currently, through satellites.

Accordingly, the signal receiver 26 in the telematics system 20 receives the signals detected by the sensor unit 10, i.e. the first to the fifth sensor 11, 12, 13, 14, 15, and outputs to the brake controller 27. On the other hand, also the GPS receiver 21 outputs the received information to the brake controller 27. The brake controller 27 calculates the distance between the traveling car and the object in front based on the information received from each sensor 11, 12, 13, 14, 15 and the GPS receiver 21, and, from the result of the calculation, determines whether the distance between the car and the object in front is closer than the preset range of the approaching distance.

That is, the telematics system 20 includes a distance setting unit 22 for setting an approaching distance between a car and an object in front while the car travels, an acceleration setting unit 23 to set an acceleration range determined by the operation of the acceleration pedal and the gear shifting lever while the car is traveling, and a deceleration setting unit 24 for setting the speed value determined by the operation of the brake pedal when the brake is applied to the car, and the information set by the distance setting unit 22, the acceleration setting unit, and the deceleration setting unit 24 is stored in memory 25. The brake controller 27 calculates the distance between the car and the object in front based on the signals detected by each sensor 11, 12, 13, 14, 15, and determines whether the accelerated car approaches the object in front closer than the range of the approaching distance (current distance>preset distance) by searching the memory 25.

At this time, as the result of the determination, when the distance between the car and the object in front is closer than the preset range of the approaching distance, the brake controller 27 determines whether the accelerator pedal and the brake pedal are operated by a driver, based on the signals detected by the third and the fourth sensor 13, 14.

Also, as the result of the determination, if the accelerator pedal is operated by the driver, the brake controller 27 outputs a control signal for controlling the operation of the accelerator pedal to the speed regulation system 30 through the signal output unit 28.

Then, the speed regulation system 30 cuts off the power transferred to the accelerator pedal operated by the driver, through the driving control of the accelerator pedal control unit 1, therefore, the car in the accelerating state slows down to the preset speed limit, and the distance to the object in front is getting longer, thereby preventing a collision accident with the object in front.

In addition, when the distance between the car and the object in front is closer than the preset range of the approaching distance, if the brake pedal is operating, the brake controller 27 determines whether the travel speed of the car resulting from the operation of the brake pedal approaches the preset braking speed value.

That is, the brake controller 27 compares the travel speed information of the car detected by the first sensor 11 with the braking speed value stored in the memory 25, while the brake pedal is being operated by the driver. As the result of the comparison, in the case where the travel speed of the car resulting from the operation of the brake pedal does not approach the preset braking speed value, the brake controller 27 outputs a signal for controlling the brake pedal more powerfully to the speed regulation system 30 through the signal output unit 28.

Then, regardless of the braking force applied by the driver, the speed regulation system 30 intensifies the braking force of the brake pedal forcibly so that the car can be applied with brake automatically, through the driving control of the brake pedal control unit 2. Accordingly, the travel speed of the car is reduced gradually, and the distance between the car and the object in front is getting longer, thereby preventing an unforeseeable collision accident of the car in advance.

In addition, as the result of the comparison, in the case where the travel speed of the car resulting from the operation of the brake pedal approaches the preset braking speed value, the brake controller 27 does not control the braking force of the brake pedal forcibly, that is, does not control the operation of the brake pedal control unit 2 through the speed regulation system 30. Therefore, the travel speed of the car is reduced by the continual operation of the brake pedal performed by the driver.

In addition, in the case where the travel speed of the car resulting from the operation of the brake pedal approaches the preset reduced speed, the brake controller 27 controls the operation of the gear shifting lever control unit 3 through the automatic transmission system 40. The gear shifting lever control unit 3 brings down the level of the gear shifting lever and reduces the speed of the car, thereby preventing a collision accident with the object in front.

On the other hand, when the travel speed of the car is reduced to the speed limit as described above, the brake controller 27 determines whether the distance between the slowed down car and the object in front maintains the preset range of the approaching distance (current distance<preset distance) by searching the information stored in the memory 25, based on the information detected by the first sensor and the second sensor as well as the information received through the GPS receiver 21. As the result of the determination, in the case where the distance between the slowed down car and the object in front does not maintain the preset approaching distance, the brake controller 27 controls the car in traveling to slow down the speed through the speed regulation system 30.

However, as the result of the determination, in the case where the distance between the slowed down car and the object in front is getting longer than the preset approaching distance, the brake controller 27 releases all the control actions so that the car can be accelerated by the driver through the speed regulation system 30.

In this way, in the present invention, when the distance between an object in front and a car is closer than an approaching distance set by the distance setting unit 22, the speed of the car is reduced automatically and thus the travel speed maintains the speed limit, thereby preventing the collision accident of the car with the object in front and enabling a safe driving.

As explained above, the present invention provides a speed controller for a car using telematics and a control method thereof, in which, by connecting a speed control unit and a brake control unit of a car together with a speed detecting sensor to a telematics system for a car, the travel speed of the car is monitored at all times, and, furthermore, if the monitored travel speed of the car exceeds a certain range (for example, the distance to an object in front or a speed limit), regardless of the operation of a driver, the brake control unit is controlled so that the car can travel within the speed limit, thereby solving the above problems caused by the narrowed distance to the object in front according to the travel speed and preventing a collision accident with the object in front in advance.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A speed controller for a car using telematics, the speed controller comprising:
   a sensor unit to detect the speed of the car according to traveling, a distance from the car to an object in front, and an operating status of a brake pedal and an accelerator pedal;
   a telematics system to output a signal to control the travel speed of the car automatically and a gear shifting signal so as to prevent a collision accident with the object in front, when the travel speed of the car and the distance from the car to the object in front exceeds a preset range of an approaching distance, in response to the signal detected by the sensor unit;
   a speed regulation system to maintain the travel speed of the car within a speed limit by controlling an accelerator pedal and a brake pedal control unit, in response to the control signal outputted by the telematics system; and
   an automatic transmission system to set a gear shifting level corresponding to the travel speed of the car controlled by the speed regulation system by automatically controlling a gear shifting lever control unit, in response to a gear shifting signal outputted by the telematics system.

2. The speed controller according to claim 1, wherein the sensor unit comprises a first sensor to detect the travel speed of a car, a second sensor to detect the distance between a car and an object in front when a car travels, a third sensor to detect the operating status of the accelerator pedal operated by a driver, a fourth sensor to detect the operation status of the brake pedal operated by a driver, and a fifth sensor to detect the gear shifting status of the gear shifting lever.

3. The speed controller according to claim 1, wherein the telematics system includes:
   a GPS receiver to receive the travel speed of the car detected by a satellite;
   a distance setting unit to set a range of the approaching distance between the traveling car and the object in front while the car is traveling;
   an acceleration setting unit to set a range of acceleration while the car is traveling, the range of acceleration being determined by the operation of the accelerator pedal and the gear shifting lever;
   a deceleration setting unit to set a range of deceleration while the car is traveling, the range of deceleration being determined by the operation of the brake pedal and the gear shifting lever;
   a memory to store the information set by the distance setting unit, the acceleration setting unit and the deceleration setting unit;

a signal receiver to receive the signal detected by the sensor unit;

a brake controller to output a signal to operate and control the accelerator pedal and the brake pedal control unit based on the information stored in the memory and a gear shifting signal to operate and control the gear shifting lever control unit, when the signal receiver receives the signal detected by the sensor unit, wherein the information contains the approaching distance to the object in front and the travel speed of the car; and a signal output unit to output the control signal and the gear shifting signal outputted from the brake controller to the accelerator pedal and brake pedal control unit and the gear shifting control unit.

4. A method of controlling a speed of a car using telematics, the method comprising:

detecting an object in front, the travel speed of the car, and an operating status of an accelerator pedal, a brake pedal, and a gear shifting lever operated by a driver, while the car is traveling;

calculating the travel speed of the accelerated car and a distance from the car to the object in front using the information detected by the detecting step, when the travel speed of the car is accelerated by the driver;

determining whether the distance between the accelerated car and the object in front is closer than a range of an approaching distance (current distance≧preset distance) from the calculated travel speed and distance;

decelerating the travel speed of the accelerated car to a speed limit through the selective control of an accelerator pedal control unit, a brake pedal control unit, and a gear shifting lever control unit, when the distance between the accelerated car and the object in front is getting closer than a preset range of the approaching distance, as the result of the above calculation;

determining whether the distance between the car and the object in front maintains the preset range of the approaching distance (current distance<preset distance), when the travel speed of the car is reduced to the speed limit); and performing the determining operation repeatedly when the distance between the decelerated car and the object in front does not maintain the preset approaching distance, or returning to the calculation operation when the distance between the decelerated car and the object in front is longer than the preset approaching distance, as the result of the above determination.

5. The method according to claim 4, wherein the determining operation comprises: reducing the travel speed of the car to the speed limit by cutting off the power of the accelerator pedal through the driving control of the accelerator pedal control unit, if the accelerator pedal is operating when the distance between the accelerated car and the object in front is closer than the preset approaching distance.

6. The method according to claim 4, wherein the determining operation further comprises:

determining whether the travel speed of the car resulting from the operation of the brake pedal approaches the preset reduced speed, if the brake pedal is operating when the distance between the accelerated car and the object in front is closer than the preset approaching distance;

reducing the speed of the car to the speed limit by controlling the operation of the brake pedal forcibly through the brake pedal control unit, if the travel speed of the car resulting from the operation of the brake pedal does not approach the preset reduced speed, as the result of the determination; and bringing down the level of the gear shifting lever, if the travel speed of the car resulting from the operation of the brake pedal approaches the preset reduced speed, as the result of the determination.

* * * * *